Patented Mar. 5, 1929.

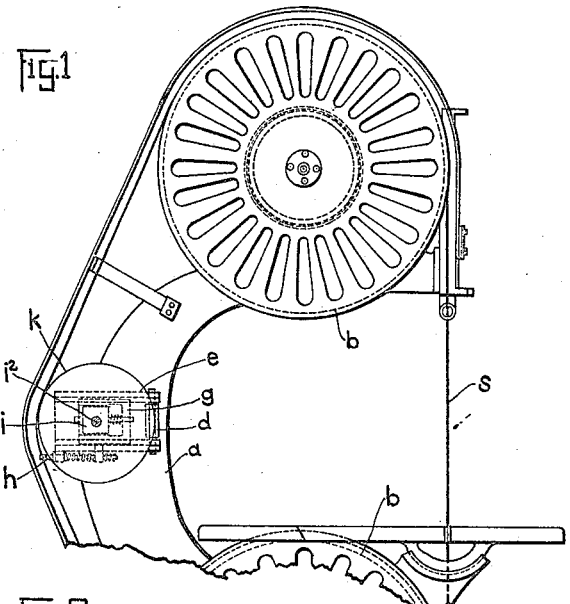
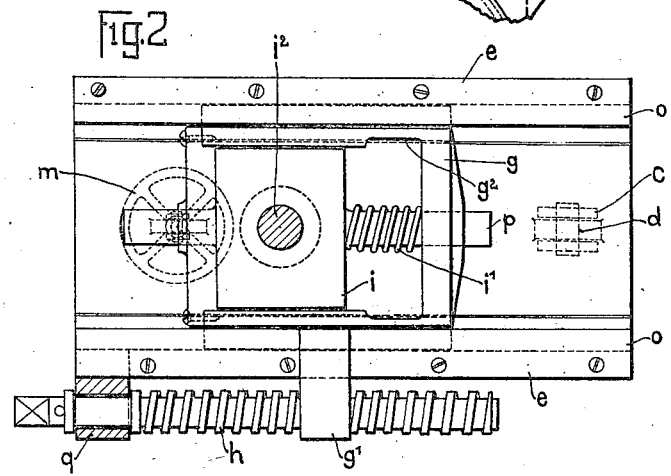
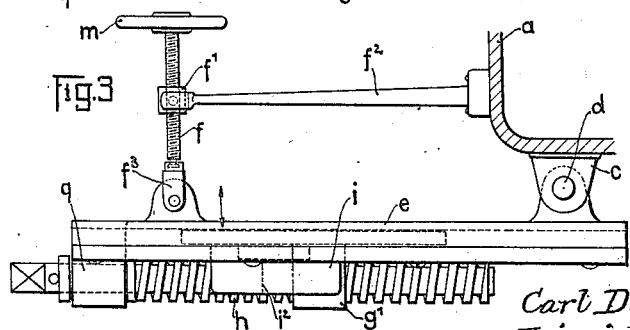

1,704,428

UNITED STATES PATENT OFFICE.

CARL DEMPEWOLF AND HEINRICH MAGER, OF BRUNSWICK, GERMANY.

BAND SAW.

Application filed December 8, 1927, Serial No. 238,650, and in Germany December 16, 1926.

Our invention relates to improvements in band-saws, and more particularly in band-saws of the type in which the saw is supported on two disks rotatably mounted in stationary bearings, and a third disk guiding the same and shiftably mounted for regulating the tension of the saw. The object of the improvements is to provide a saw of this type in which the saw is yieldingly supported on the said disks, and in which the saw does not run off from the disks. With this object in view our invention consists in mounting the said guiding disk with its axis on a yieldingly supported guide block mounted for being shifted with its axis parallel to a slide which is likewise capable of being shifted in the same direction, the said slide being mounted on an arm rockingly mounted so as to vary the angular position of the said axis of the guide disk.

For the purpose of explaining the invention an example embodying the same has been shown in the accompanying drawing, in which the same letters of reference have been used in all the views to indicate corresponding parts.

In said drawing,

Fig. 1, is an elevation showing the top part of the band-saw,

Fig. 2 is an elevation on an enlarged scale showing the rockable guide member carrying the slide and the guide disk, and Fig. 3, is a top plan view of Fig. 2.

In the example shown in the drawing the band-saw consists of a frame $a$, provided with upper and lower disks $b$ mounted in fixed bearings and having the saw $s$ trained thereon. Further, the saw $s$ is guided on a disk $k$ which is adapted to be moved in horizontal direction and towards and away from the disks $b$ for regulating the tension of the saw, and which, further, is adapted to be rocked with its pin $i^2$ within a horizontal plane for setting the said axis at the proper angle relatively to the axes of the disks $b$.

To permit the said movements the disk $k$ is mounted as follows: In two eyes $c$ formed on the frame $a$ of the machane a vertical bolt $d$ is mounted, and on the said bolt a frame $e$ is rockingly mounted which is formed with a guide way $o$ having a slide $g$ movable therein. At its outer end the frame $e$ is provided with a screw-threaded spindle $f$ having a nut $f^1$ screwing thereon, the said nut being pivotally connected to an arm $f^2$ fixed to the frame $a$, and the spindle $f$ being rotatably mounted on an eye $f^3$ jointed to the frame $e$. To the outer end of the spindle $f$ a hand wheel $m$ is secured. The slide $g$ is formed with an internally screw-threaded eye $g^1$ engaged by a screw-threaded spindle $h$ rotatably mounted in an eye $q$ formed on the frame $e$. Thus, by turning the spindle $h$ by means of a wrench the slide $g$ is shifted inwardly or outwardly on the frame $e$. The slide $g$ is in the form of a window having a rectangular opening $g^2$, and in the said opening the block $i$ is located, which is fixed to a rod $p$ shiftable in bores of the slide $g$, a spring $i^1$ tending to force the block $i$ outwardly. The block $i$ carries a pin $i^2$ on which the disk $k$ is rotatably mounted.

By turning the spindle $h$ engaging the eye $g^1$ the slide $g$ is shifted inwardly or outwardly for regulating the tension of the saw $s$, and the tension is elastic by reason of the spring $i^1$ acting on the block $i$. For setting the pin $i^2$ in the proper angular position for preventing the saw $s$ from running off the disk $k$, the frame $e$ is rocked by means of the hand wheel $m$ and the spindle $f$.

We claim:

A band-saw, comprising a frame, a pair of disks adapted to have the saw trained thereon, a frame rockingly mounted on an axis perpendicular to the axes of said disks, means for setting said frame in different angular positions, a slide movable on said frame in a direction towards and away from said disks, means for shifting said slide on the frame, a block yieldingly supported on said slide, and a disk rotatably mounted on said block with its axis substantially parallel to the axes of said disks of the pair.

In testimony whereof we affix our signatures.

CARL DEMPEWOLF.
HEINRICH MAGER.